UNITED STATES PATENT OFFICE.

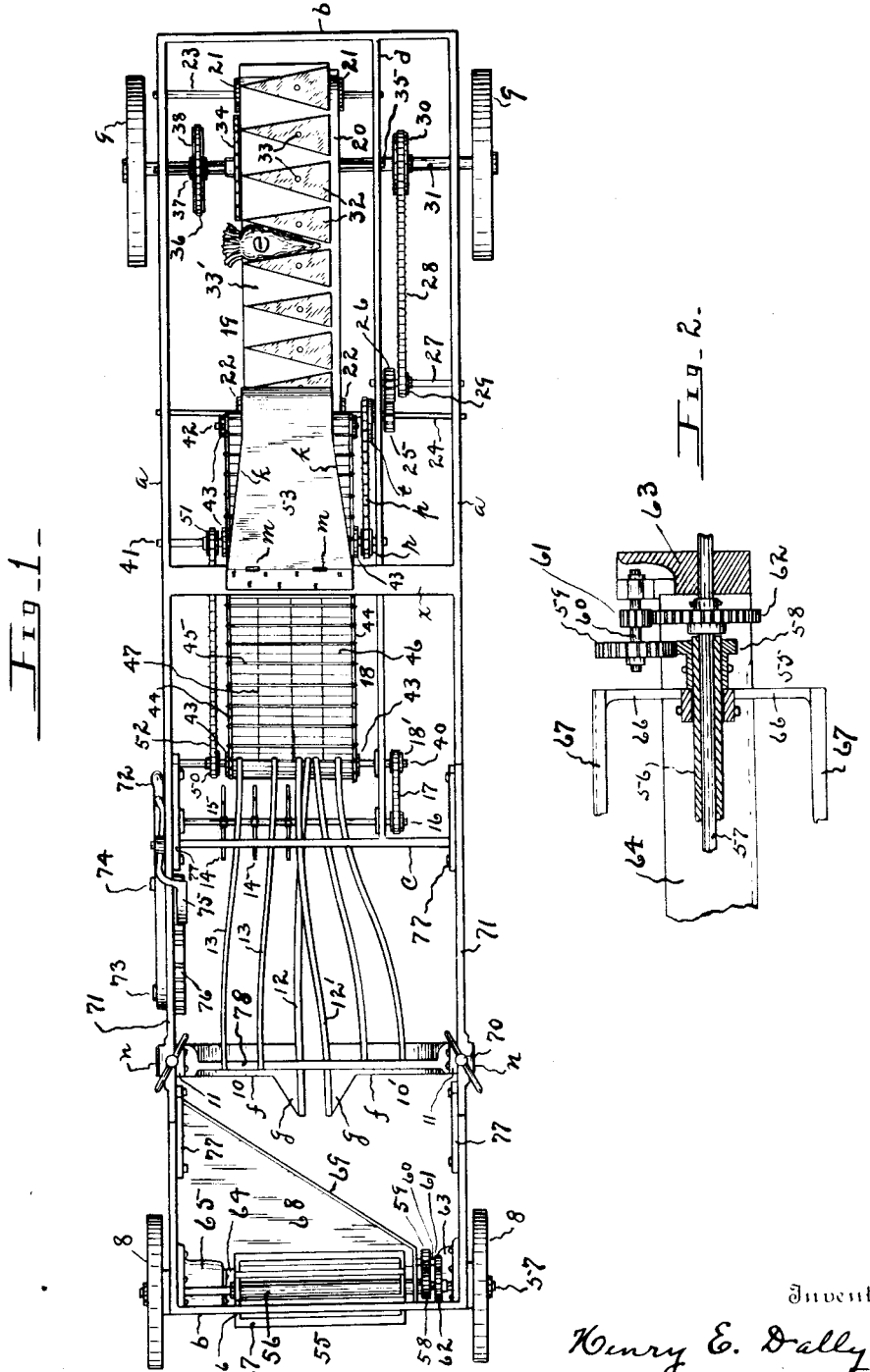

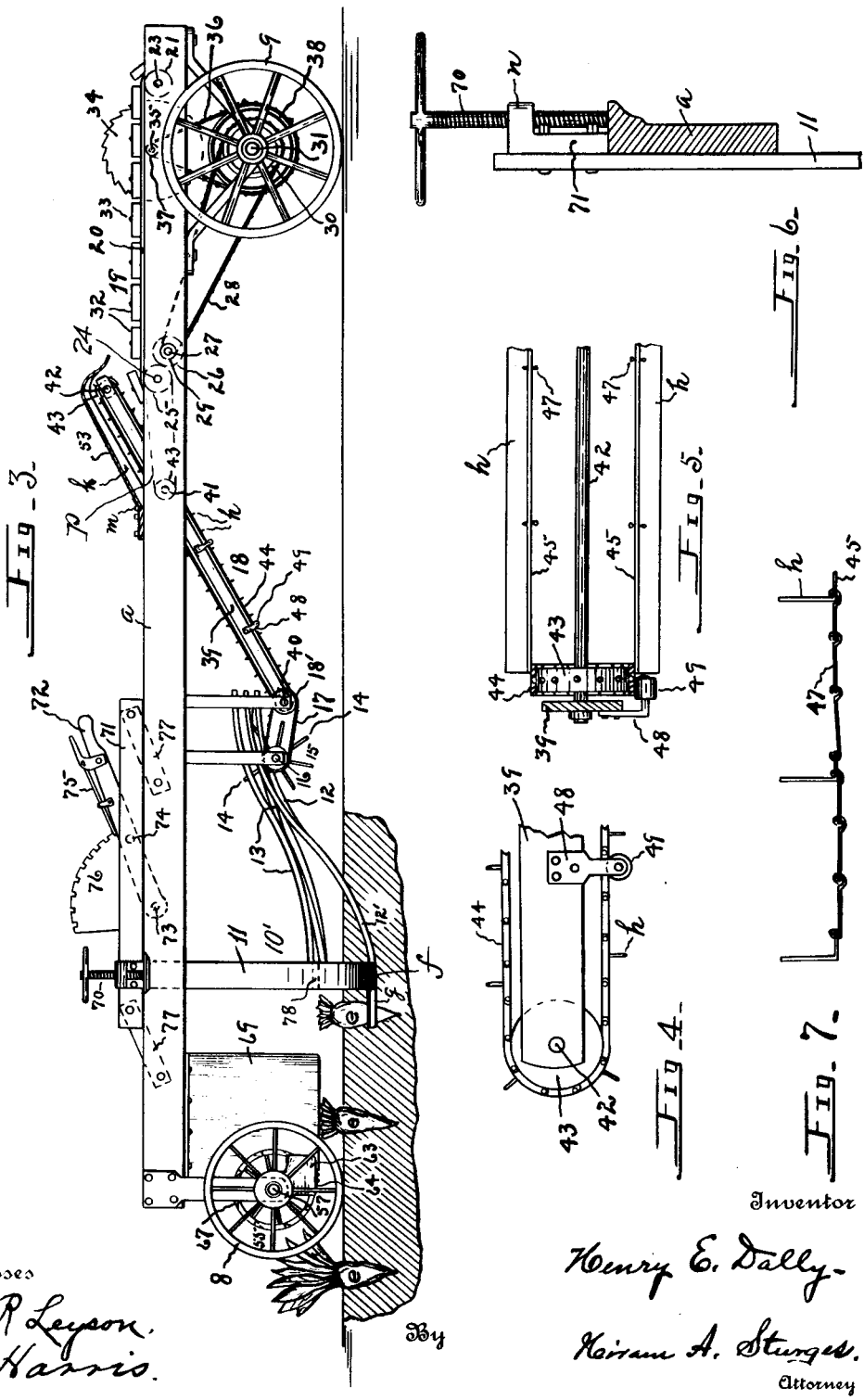

HENRY E. DALLY, OF OSMUND, NEBRASKA.

BEET-HARVESTER.

1,119,138.  Specification of Letters Patent.  Patented Dec. 1, 1914.

Application filed November 21, 1913. Serial No. 802,202.

*To all whom it may concern:*

Be it known that I, HENRY E. DALLY, a citizen of the United States, residing at Osmund, in the county of Pierce and State of Nebraska, have invented certain new and useful Improvements in Beet-Harvesters, of which the following is a specification.

This invention relates to beet harvesters, and has for its object to improve the construction shown in United States Letters Patent numbered 762,390, dated June 14th, 1904, for beet harvesters, so that the movements of the beets may be under the control of devices which will operate to advantage for conducting them to the topping knife or circular cutter.

The invention consists of the novel construction, combination and arrangement of parts as described herein and claimed, and as illustrated in the drawing, wherein,—

Figure 1 is a plan view of a beet harvester embodying my invention. Fig. 2 is an enlarged detail, partly in section, showing a part of a leaf cutter. Fig. 3 shows a side elevation of the beet harvester, the alining-hood being in longitudinal section. Fig. 4 is a side view showing a part of the carrier. Fig. 5 shows a part of the carrier in transverse section. Fig. 6 is a detail view, showing means for making a vertical adjustment of a plow-arm. Fig. 7 is an enlarged detail showing a part of one of the flexible, longitudinal strips of the carrier.

Referring now to the drawing for a more particular description, the implement consists, in part, of a vehicle having any suitable frame, preferably consisting of side pieces *a*, end-pieces *b*, transverse braces *c* and *x* suitably connecting the side pieces, and a longitudinal brace *d* connecting the transverse brace *c* with the rear end of the frame. The front and rear wheels of the vehicle are respectively indicated at 8 and 9.

It will be understood that sugar beets *e* to be harvested, are disposed in rows, and in order that they may be removed from the ground, a pair of plow-members are employed, each being respectively indicated at 10 and 10', and consisting of a curved blade *f* with a forwardly projecting part *g*, said blades being disposed transversely of the vehicle, opposite to each other and each being provided with an upwardly-projecting arm 11.

The blade of plow-member 10 is provided with a rearwardly extending and upwardly curved prong 12 and with the pair of prongs 13. The blade of plow-member 10' has a rearwardly extending, upwardly-curved prong 12', the rear part of which is disposed above and "crosses" or extends somewhat nearer to the "off" side of the vehicle than prong 12. It will thus be seen that, as the vehicle moves forward, the beets of a row may be disposed between prongs 12 and 12', and may be engaged in succession by these prongs, and while so engaged may be carried upwardly therebetween, one beet being pressed against another, and on account of the curvature of the rear parts of prongs 12 and 12', the beets will fall on their sides upon prongs 13 with their heads toward the "off" side of the vehicle.

Immediately after the beets are disposed upon prongs 13 they will be moved rearwardly thereof by means of arms 14 of the conveyer 15, said arms being interposed between the prongs while mounted on shaft 16, arranged to be rotated by chain 17, movable by chain-sprocket 18', mounted on shaft 40; and as the beets are successively moved rearwardly by operation of arms 14, they will be deposited upon the front end of carrier 18.

In order that the tops of the beets may be removed, a movable beet-holder 19 is provided, consisting of the endless apron 20 disposed longitudinally of the vehicle and mounted on the rollers or drums 21 and 22. Drum 21 is mounted on the idler shaft 23 and drum 22 is mounted on the driven shaft 24. Shaft 24 is driven by means of its gear 25 being in engagement with gear 26 of shaft 27, shaft 27 being rotated by means of chain 28 in engagement with the chain-sprocket 29, said chain 28 working on the chain-sprocket 30 of axle 31 of the rear vehicle wheels.

Disposed side-by-side are outwardly-convergent spacing-blocks 32, these being secured to the apron by means of pins 33, and they provide outwardly-divergent containers, recesses or pockets 33' with ends opening upon one of the edges of apron 20.

At 34 is indicated a cutter-member, preferably formed as a circular saw. It is disposed adjacent to the open ends of the outwardly-divergent pockets or recesses, and parallel with the edge of the endless apron. Member 34 is mounted on the transverse shaft 35, said shaft having suitable bearings in the vehicle frame and being rotatable by means of the chain 36 in engagement with the comparatively small chain-sprocket 37 and with the large chain-sprocket 38, said chain-sprocket 38 being mounted upon the rear vehicle axle.

The carrier 18 consists of the pair of side-plates 39 traversed by the parallel shafts 40, 41 and 42, said shafts being disposed transversely of the vehicle and each provided with a pair of chain-sprockets 43.

At 44, in engagement with chain-sprockets 43, is indicated a pair of endless chains, said chains being adapted to move the carrier 18, since they engage the chain-sprockets 43 of shaft 41.

By reference to Fig. 1 it will be seen that shaft 41 may be rotated by chain $p$ in engagement with the chain-sprocket $r$, said sprocket $r$ being mounted on shaft 41 and the chain $p$ being in engagement with chain-sprocket $t$ of the driven shaft 24.

Disposed at longitudinal intervals of and secured at their ends to chains 44 are contact-strips 45, and at 46 (Fig. 1) are indicated supporting-rods, said rods being disposed between and parallel with strips 45 and secured at their ends to chains 44. Secured end-to-end and to strips 45 are flexible supporting members 47, and it will be understood that the rods 46 and members 47 are for the purpose of supporting the beets after they have been deposited on the carrier, the beets being disposed and carried between the upwardly projecting flanges $h$ of the contact-strips 45.

In order that the chains 44 may be sustained substantially parallel with plates 39 and to prevent "sagging" of said chains, brackets 48 may be secured upon the sides of said plates and rollers 49 may be mounted on the brackets for engagement with and to sustain the weight of said chains.

Shafts 40 and 41 are provided with the respective chain-sprockets 50 and 51, and said sprockets are provided with the chain 52.

As thus described the beets will be conducted by carrier 18 rearwardly of the vehicle, and as they fall upon the rearwardly movable apron 20, an operator who may be in attendance may place them suitably within the pockets 33′, so that the tops may be severed by the cutting-member 34.

Since the beets may not be disposed at uniform distances from the sides of carrier 18, and since pockets 33′ have a less length than the width of said carrier, an alining-hood 53 is provided, having outwardly-convergent sides $k$, and as the beets are moved rearwardly by flanges $h$, they may be engaged by said convergent sides of the hood and thereby moved transversely of the carrier, so that they may be deposited upon the movable beet-holder. The front end of the hood is preferably secured to the frame-brace $x$, and is provided with hinges $m$ so that it may be conveniently elevated when desired.

A mower is indicated at 55, consisting of a sleeve 56 adapted to be rotated upon the axle 57 of the front wheels at a considerable speed, since it is provided with a gear 58 of limited diameter adapted to engage a gear 59 of greater diameter mounted on the stub-shaft 60, a small gear 61 also being mounted on shaft 60 and engaging the large gear 62, said gear 62 being mounted to move with axle 57. Shaft 60 is mounted in suitable bearings supported by bracket 63.

At 64 is indicated a cutter-bar suitably mounted upon brackets 63 and 65, these brackets being disposed adjacent to the front wheels and suitably secured to the vehicle frame.

At 66 are indicated radially-disposed arms upon which are mounted blades 67.

The parts are so arranged that only the upper ends of the beet-leaves will be cut, for the reason that the beets often project above the surface of the ground; but in order that the beets may be carried through the harvester, and will be under control, in the manner above mentioned, it is necessary that a considerable part of the leaves be removed, and the cutter-member 55 is of advantage for this purpose.

At 68 is indicated a platform having an inclined wall 69, these parts forming a chute or passage way disposed rearwardly of the cutter-bar, so that the tops of the beets which have been severed may be deposited upon the "off" side of the vehicle.

Arms 11 must extend downwardly from the vehicle frame a sufficient distance so that blades $g$ will generally be disposed below the middle parts of the beets, during operation, and since this distance may vary, when the harvester is used in different fields of beets, means are provided for the vertical adjustment of the mounting of arms 11, consisting of screws 70 having threaded connections with projections $n$ of horizontal plates 71, said arms being secured to and movable with said plates; and when moving the vehicle from one field to another or upon a highway, the blades and arms 11 may be elevated above the surface of the ground by means of hand-lever 72, said lever being pivotally mounted at one of its ends, as indicated at 73, upon one of sides $a$ of the vehicle frame, and pivotally mounted between its ends, as indicated at 74, upon one of plates 71, and held in an elevated position by means of the pawl and ratchet indicated, respectively, at 75 and 76, the pairs of links 77 being provided for each horizontal plate 71, each link having one of its ends pivotally mounted upon a side $a$ of the vehicle frame, its opposite end being pivotally mounted upon a horizontal plate 71, as plainly shown in the drawing.

At 78 is indicated a brace-member disposed transversely of the vehicle. It extends between and is suitably secured to arms 11 above the blades *g* to operate as a reinforcement for the plow-arms, so that said arms may sustain the stresses imposed thereon; and said brace also provides a mounting for a part of the rearwardly-projecting prongs.

Having fully described the several parts, a further explanation relating to operation is not necessary.

What I claim as my invention and desire to secure by Letters Patent is,—

1. A beet harvester, comprising, in combination with a vehicle, an endless apron mounted upon and adapted to be moved longitudinally of the vehicle, said apron being provided at longitudinal intervals with triangular compartments opening on one of its edges; a circular, rotatable cutting-member disposed adjacent to said endless apron; an inclined, endless, movable carrier disposed longitudinally of the vehicle to overhang a part of said endless apron; plow-members carried by the vehicle and provided with upwardly curved prongs extending rearwardly to overhang a part of the carrier; a transverse, rotatable shaft provided with radially disposed arms interposed between the prongs of a plow-member; and a longitudinally convergent hood adapted to overhang a part of the carrier and a part of said endless apron.

2. A beet harvester, comprising, in combination with a suitable frame, supporting wheels mounted thereon; vertically-adjustable plow-members carried by the frame provided with upwardly-curved, rearwardly-extending prongs; a transverse shaft carried by the frame while disposed below said prongs and provided with radially arranged arms; a beet-holder consisting of an endless apron; a cutter-member mounted adjacent to said endless apron; an inclined carrier having one of its ends disposed above the beet-holder, its opposite end being disposed below the prongs of the plow-members; mechanism for moving the beet-holder; mechanism for moving the carrier, and devices connected with the carrier and said transverse shaft for causing said radially arranged arms to move intermediate said upwardly-curved, rearwardly-extending prongs.

In testimony whereof I have affixed my signature in presence of two witnesses.

HENRY E. DALLY.

Witnesses:
WM. H. SCHULZ,
OTTO F. PAEGE.